United States Patent [19]
Peuterbaugh

[11] Patent Number: 5,628,589
[45] Date of Patent: May 13, 1997

[54] INTERNAL PULL BROACH WITH INDEXABLE INSERTS

[75] Inventor: Bruce G. Peuterbaugh, Mt. Clemens, Mich.

[73] Assignee: J. P. Tool, Inc., Macomb, Mich.

[21] Appl. No.: 248,398

[22] Filed: May 24, 1994

[51] Int. Cl.$^6$ .................................................. B23D 43/04
[52] U.S. Cl. ................................................. 407/15; 407/18
[58] Field of Search ................................... 407/13, 15–19

[56] References Cited

U.S. PATENT DOCUMENTS

| | | | |
|---|---|---|---|
| 1,370,837 | 3/1921 | Perkins | 407/17 |
| 3,317,984 | 5/1967 | Jacobson | 407/18 |
| 4,243,347 | 1/1981 | Clapp et al. | 407/15 |
| 4,273,479 | 6/1981 | Raupp, Jr. et al. | 407/113 |
| 4,274,766 | 6/1981 | Raupp, Jr. et al. | 407/15 |
| 4,740,115 | 4/1988 | Hertel et al. | 407/15 |
| 5,242,251 | 9/1993 | Armstrong et al. | 407/15 |

OTHER PUBLICATIONS

J.P. Tool, R–I–B–1000® Broaching.

*Primary Examiner*—M. Rachuba
*Assistant Examiner*—Kenneth J. Hansen
*Attorney, Agent, or Firm*—Young & Basile, P.C.

[57] ABSTRACT

An internal pull broach is disclosed for roughing, semi-finishing and finishing at least one wall in a workpiece during a single stroke machining operation. The broach includes an elongated cutting tool holder having a longitudinal axis and a plurality of laterally extending, longitudinally spaced pockets. Cutter inserts are disposed in each of the pockets to define a plurality of sequentially acting protuberances. Each protuberance has a cutting edge extending laterally with respect to the longitudinal axis of the tool holder substantially across an entire width of the tool holder for progressively cutting into the wall of the workpiece sequentially as the tool holder moves during the single stroke along a fixed path coaxial with the longitudinal axis of the tool holder. Preferably, the longitudinally spaced pockets are subdivided into groups having unique configurations or fastener patterns, so that corresponding cutter inserts having identical configurations or fastener patterns are independently indexable and replaceable within corresponding pocket configurations, while being interchangeable only within a respective pocket configuration group.

18 Claims, 4 Drawing Sheets

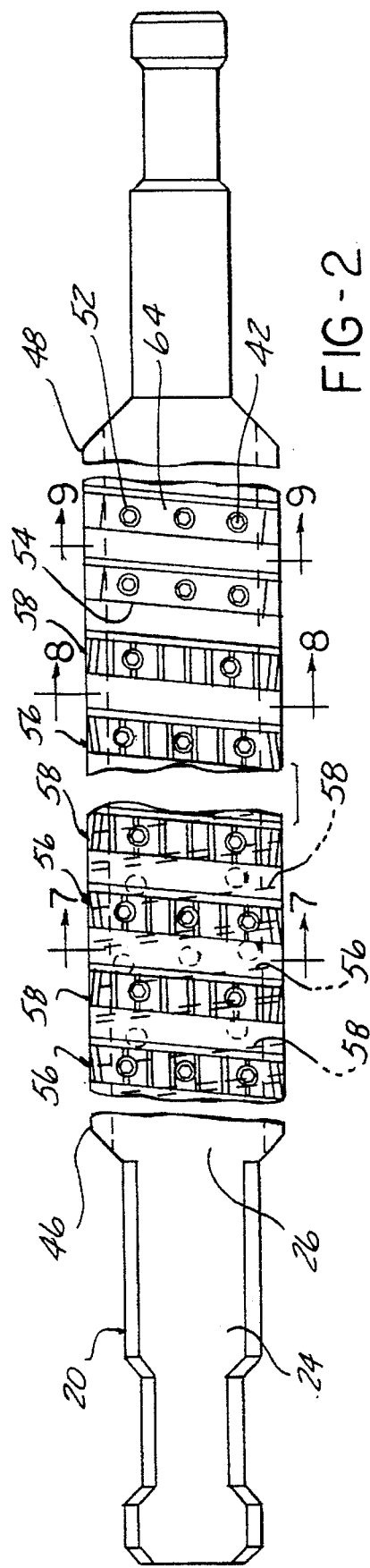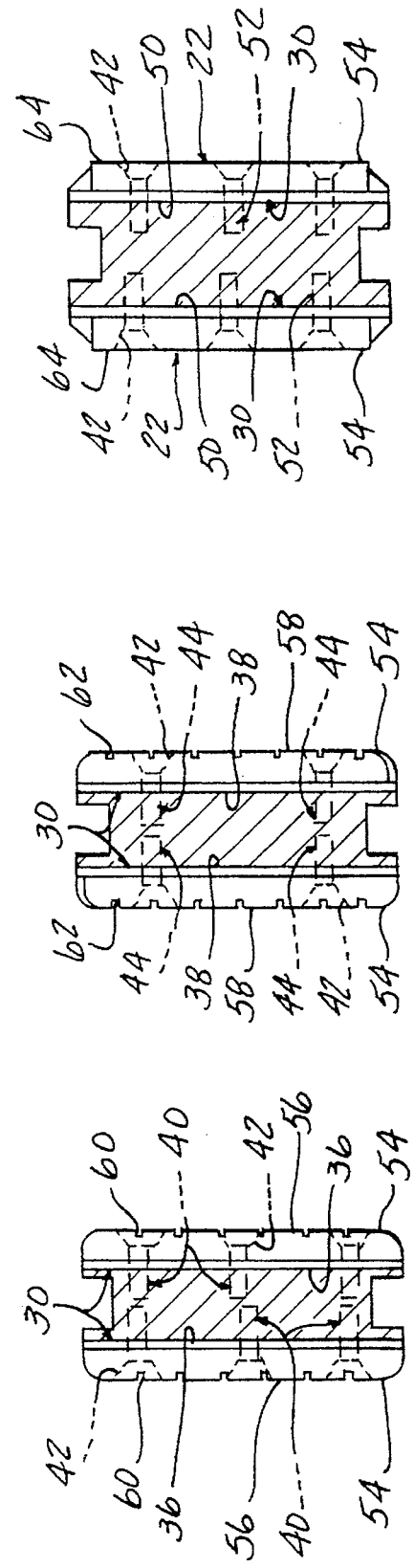

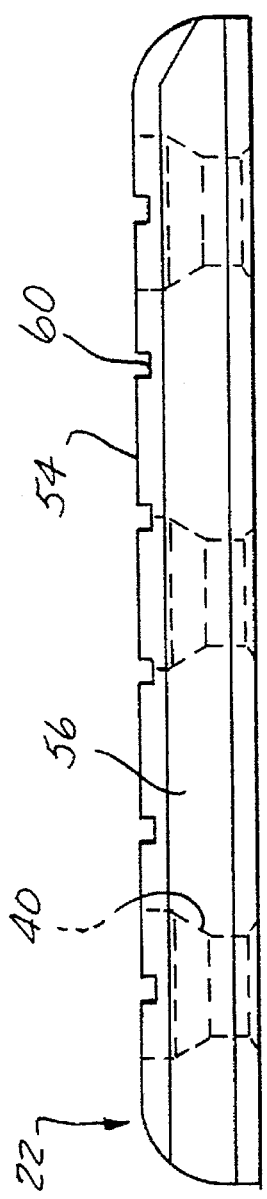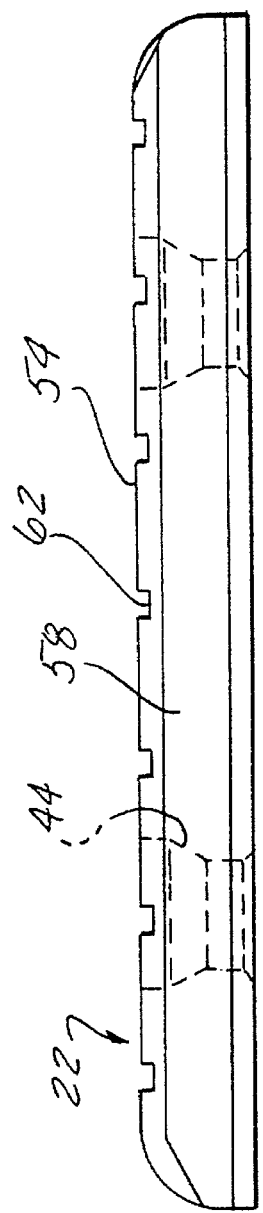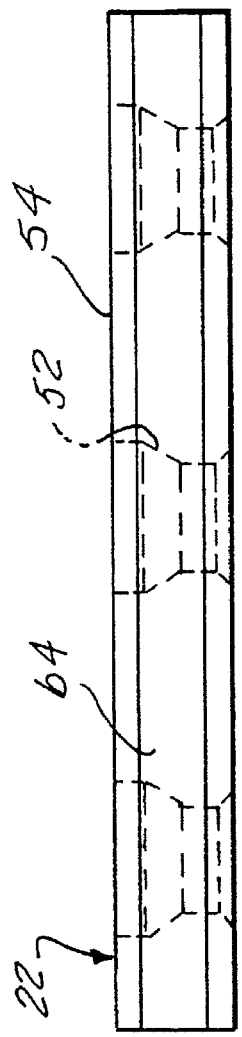

INTERNAL PULL BROACH WITH INDEXABLE INSERTS

FIELD OF THE INVENTION

This invention relates to a machine tool for performing broaching operations on a workpiece, such as a differential carrier, and more particularly, to a machine tool carrying a plurality of indexable cutting inserts on an elongated tool body that reciprocally moves longitudinally for roughing, semi-finishing and finishing opposing walls of a rectangular slot in a workpiece during a single stroke machining operation.

BACKGROUND OF THE INVENTION

Broach tools have been used for many years for the machining of metal, and for specific operations such as broaching slots, openings or channels of specialized cross-section. The conventional broaching tool has been a unitary broach having a plurality of cutting teeth formed on a single solid elongated member. Several shortcomings however, have been associated with the use of such elongated broaches. For example, the quality of the overall tool is only as good as the worst tooth, with the existence of an undersized tooth resulting in an overloading of the next tooth, as well as making it necessary, through wear or otherwise, to discard the entire tool even though there is still useful life left in many or all of the other teeth. Of course, the entire tool is also lost as the result of any tool damage or cracking with respect to any one tooth or any one part of the tooth. In addition, the type of material from which the tool is made is restricted. More particularly, while high speed steels have been used to form the elongated broaches, tougher, more expensive materials such as carbides, cannot be used because of the prohibitive costs associated with the initial manufacture of the tool, as well as the cost of replacements necessitated by the fact that damage to any one part of the tool requires it to be discarded.

Another type of broaching tool which has been used is one which includes a plurality of separate cutting inserts which are fixed to the tool body. Typically, the inserts are formed from a cemented carbide or other hard metal. The conventional design for tools of this type are generally of brazed construction, i.e. carbide blanks are permanently fastened to a steel holder with brazed material and ground after brazing to the required cutter configuration. Proper brazing of the carbide to the steel along with grinding the carbide after brazing is critical, yet due to space limitations, is extremely difficult. The brazing of the carbide tips requires that each be held in proper position during the brazing procedure to facilitate grinding to form after brazing. Furthermore, it is necessary for a successful broaching operation that each tip is securely and properly brazed to the steel body. Unfortunately, it is often common for a brazed joint to come apart in the grinding operation or in the actual broaching of the part. In either event, if the carbide tip breaks, a new tip must be rebrazed and the form reground. The conventional brazed construction thus offers little advantage over high speed tooling since downtime and requalifying of a broach set is a lengthy process. In addition to broaches having brazed inserts, there are tools in which the cutting inserts are in some way clamped to the tool.

Overall, broaching is an excellent method of machining many materials when both precision and high production rates are required. In particular, it is widely used in the automotive industry for forming various contours into engine blocks and other automotive components. While the rate of production of broaches is high, this has been somewhat offset in the past by the relatively high cost of the initial broach and of resharpening the broach after it has become dulled. To overcome the later of these difficulties, various designs using indexable and reversible inserts have been introduced. However, not all of these designs have been capable of producing cuts that were as precise or economical as could be desired. In particular, some of these designs resulted in uneven chip load upon the inserts which is thought to cause precision lessening vibration. In addition, uneven chip load also results in inserts wearing at varying rates so that either all inserts are indexed at one time even, if only some are worn; or when production is stopped for indexing or replacement, the worn inserts are indexed or replaced, but production is halted again later when other inserts become worn. Either procedure is less than ideal. A further detriment to some of these designs is found in the uneven power requirements resulting from rows of inserts entering the workpiece simultaneously. Thus, with those designs presenting rows of inserts, the power required would increase suddenly each time a row of inserts contacted the workpiece then decrease suddenly each time a row left the workpiece. It is thought that in some cases, this might have contributed to vibration and hence, harmed precision of the machining operation.

SUMMARY OF THE INVENTION

It is desirable in the present invention to provide an internal pull broach for roughing, semi-finishing and finishing at least one wall in a workpiece during a single stroke machining operation, where an elongated cutting tool holder includes a plurality of sequentially acting protuberances on each of which there is a cutting edge or point, adapted to move in a straight line with respect to the work so that a first protuberance makes a shaping cut into that surface in the work and is followed by a second protuberance which makes a deeper shaping cut into that surface of the work, so that the actions of sequentially acting protuberances is cumulative. In addition, it is desirable to provide an internal pull broach where the cutter is detachable from the tool holder and wherein the tool holder includes a pocket specifically intended to receive the cutter. It is further desirable to provide an internal pull broach including a first plurality of cutting protuberances for engaging the work in a first manner and including a second plurality of cutting protuberances for sequentially engaging the work in a second manner. It is desirable that the internal pull broach according to the present invention provides a broach where the chip load on the various inserts can be made more uniform and the power requirement fluctuations caused by multiple inserts simultaneously entering or leaving the workpiece can be reduced.

The present invention relates to an internal pull broach for roughing, semi-finishing and finishing at least one wall in a workpiece during a single stroke machining operation. The internal pull broach according to the present invention includes an elongated cutting tool holder having a longitudinal axis and a plurality of laterally extending, longitudinally spaced pockets and indexable cutter insert means disposed in each of the pockets defining a plurality of sequentially acting protuberances. Each protuberance according to the present invention has a cutting edge extending laterally with respect to the longitudinal axis substantially across an entire width of the tool holder for progressively cutting into the wall of the workpiece sequentially as the tool holder moves during the single stroke along a fixed path coaxial with the longitudinal axis.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 is a plan view of an elongated cutting tool holder having indexable cutter inserts according to the present invention;

FIG. 4 is an elevational view of a first configuration for a rough cutting indexable insert according to the present invention;

FIG. 5 is an elevational view of a second configuration for a rough cutting indexable insert according to the present invention;

FIG. 6 is an elevational view of a third configuration for a finish cutting indexable insert according to the present invention;

FIG. 7 is a cross-sectional view of the elongated cutting tool holder taken as shown in FIG. 2;

FIG. 8 is a cross-sectional view of the elongated cutting tool holder taken as shown in FIG. 2; and FIG. 9 is a cross-sectional view of the elongated cutting tool holder taken as shown in FIG. 2.

DESCRIPTION OF THE PREFERRED EMBODIMENT

Figure 1:
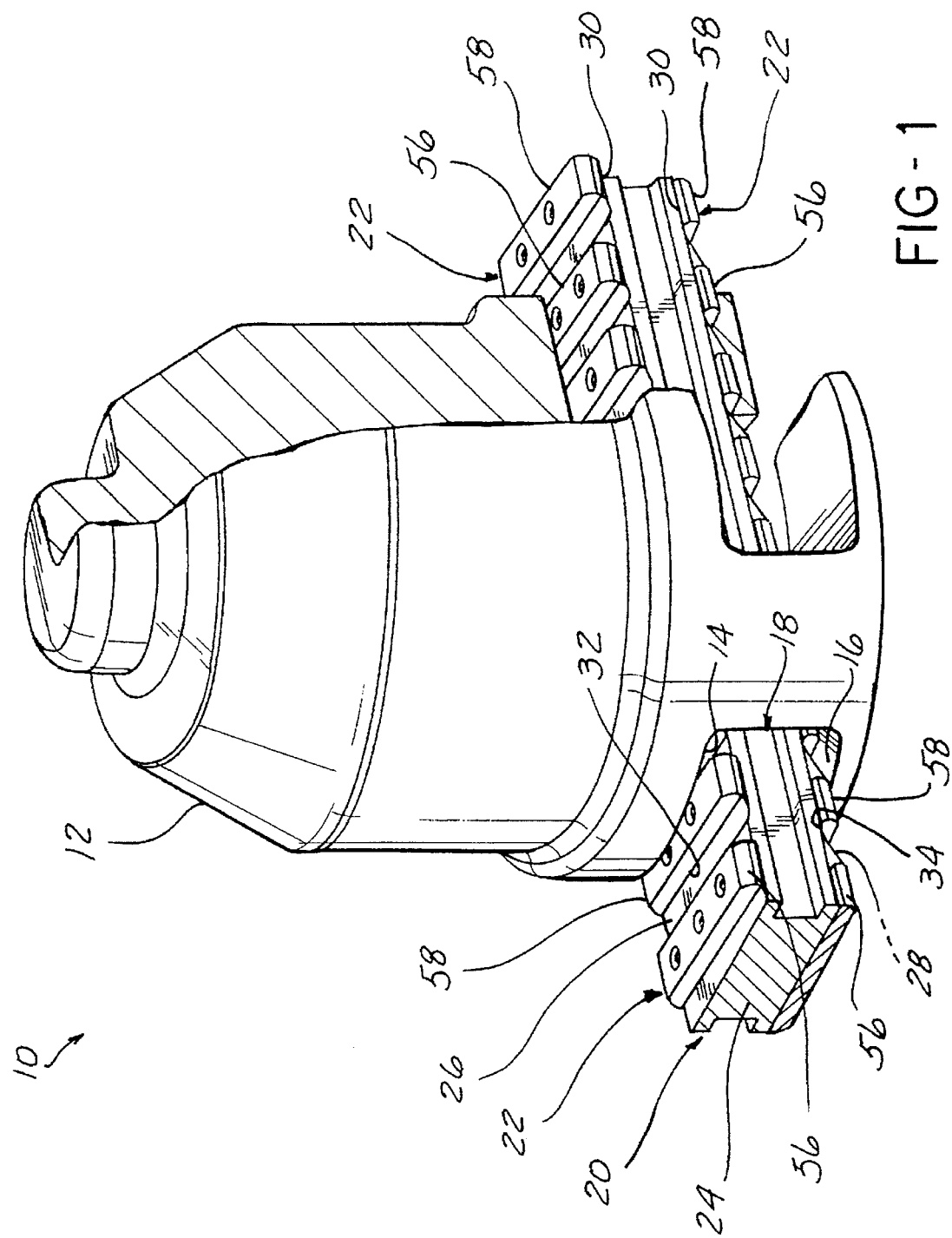
FIG. 1 schematically illustrates a workstation for machining a rectangular slot in a workpiece according to the present invention.

In FIG. 1 there is schematically illustrated a workstation 10 for machining a workpiece 12, such as a differential gear case transmission. The workpiece 12 has at least one wall 14, and preferably opposing walls and 16 of a rectangular slot 18, requiring roughing, semi-finishing and finishing machining operations. The machining operations are performed according to the present invention with an internal pull broach 20 during a single stroke machining operation along a fixed path coaxial with a longitudinal axis of the internal pull broach 20. Previously, these machining operations have always been accomplished with a one piece, high speed, steel broach that requires time consuming resharpening. The internal pull broach 20, according to the present invention, includes indexable cutter insert means 22 to eliminate the time consuming broach resharpening process. The indexable cutter insert means 22 of the present invention makes tool changes fast, easy and less expensive. The use of indexable cutter insert means 22 with an internal pull broach 20 makes the changing of cutting materials easy and optimizes machine use. The internal pull broach 20 passes through an aperture, such as rectangular slot 18, in the workpiece 20, and is pulled through the aperture to machine the aperture to the size and shape required. There is a progressive increase in tool height from tooth to tooth, each tooth in effect progressively removing some material from the workpiece 12 until the desired dimensions are obtained. The progressive increase in tooth height from tooth to tooth for the roughing teeth is greater than the progressive increase in tooth height from tooth to tooth for the semi-finish teeth. The progressive increase in tooth height from tooth to tooth is the equivalent of the chip load. After the rough and semi-finish teeth, a series of finishing teeth is provided at a constant height to finish machining the workpiece 12 to the desired dimension.

The internal pull broach 20 includes an elongated cutting tool holder 24 having a longitudinal axis. First and second surfaces, 26 and 28 respectively, are located on opposite longitudinally extending sides of the tool holder 24. A plurality of laterally extending, longitudinally spaced pockets 30 are formed in at least one of the first and second surfaces, 26 and 28 respectively, and preferably in each of the first and second surfaces. Preferably, each pocket 30 laterally extends at an angle of approximately 5° from normal with respect to the longitudinal axis of the tool holder 24. In the preferred configuration, a leading edge 32 of one pocket 30 in the first surface 26 is laterally opposite from a leading edge 34 of a corresponding pocket 30 in the second surface 28, and the pockets are staggered longitudinally so that only one cutting edge initiates contact with the workpiece 12 or leaves contact with the workpiece 12 at a time to reduce the problems associated with vibration, chip load and power requirement fluctuations.

Figure 3:
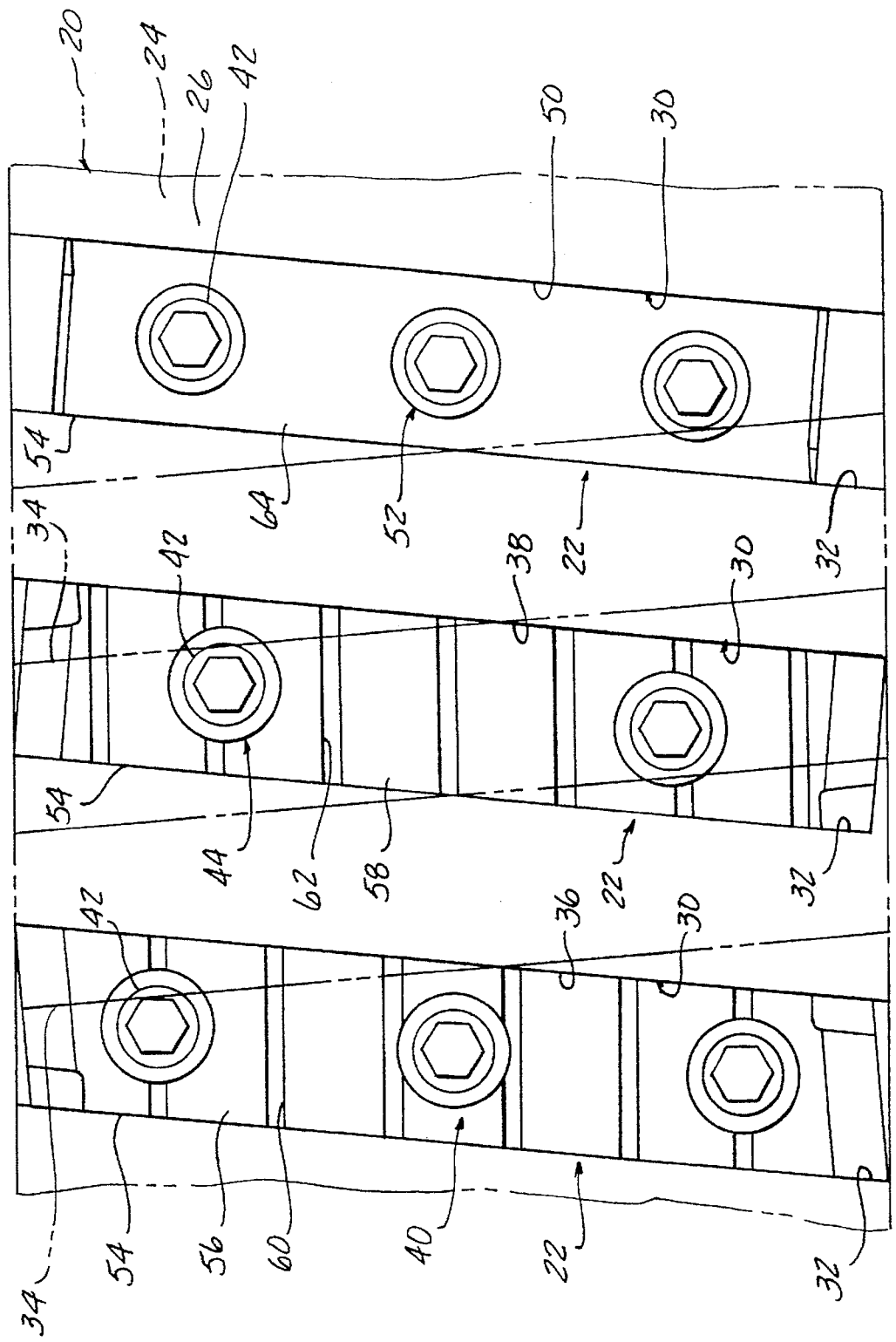
FIG. 3 is a detail plan view of a portion of the elongated cutting tool holder with indexable cutter inserts according to the present invention.

The pockets 30 are preferably divided into groups including a first pocket configuration 36 and a second pocket configuration 38 alternately disposed along a predetermined first longitudinally extending length of the tool holder 24. The first pocket configuration 36 has a first fastener means pattern 40 as best seen in the far left-hand side of FIGS. 2 and 3. For purposes of illustration and not limitation, the first fastener means pattern 40 is depicted as having three laterally spaced apart fasteners 42 as best seen in FIG. 7. The second pocket configuration group 38 has a second fastener means pattern 44 different from the first fastener means pattern 40. As best seen in FIGS. 2, 3 and 8, the second fastener means pattern 44 is illustrated immediately to the right of the first fastener means pattern 40. For purposes of illustration and not limitation, the second fastener means pattern 44 is shown as having two laterally spaced apart fasteners 42. The unique patterns of the first and second pocket configuration groups, 36 and 38 respectively, prevent improper installation of replaceable and indexable cutter insert means 22 from the desired pattern. Preferably, the desired pattern includes the first and second fastener means patterns, 40 and 44 respectively, alternately disposed along a predetermined first longitudinal length of the tool holder 24. As can best be seen in FIG. 2, the alternating "first pattern 40 -second pattern 44" continues along a longitudinal length of the tool holder 24 from a first end or roughing end 46 along a substantial portion of the longitudinal length of the tool holder 24 toward a second end or finishing end 48. A third pocket configuration group 50 is disposed along a second longitudinal length of the tool holder 24 adjacent one end. The third pocket configuration group 50 has a third fastener means pattern 52 different from the first and second fastener means patterns, 40 and 44 respectively. For purposes of illustration and not limitation, as best seen in FIGS. 2 and 3, the third fastener means pattern 52 is depicted as three laterally spaced fasteners 42, where the spacing between the three fasteners of the third fastener means pattern 52 is different from the spacing between the three fasteners depicted in the first fastener means pattern 40. This unique third fastener means pattern 52 prevents improper installation of one of the roughing cutters corresponding to the first pocket configuration group 36 or second pocket configuration group 38 from being installed in the finishing cutter position of the third pocket configuration group.

Indexable cutter insert means 22 is disposed in each of the plurality of laterally extending, longitudinally spaced pockets 30 to define a plurality of sequentially acting protuberances. Each protuberance has a cutting edge 54 extending laterally with respect to the longitudinal axis of the tool holder 24 substantially across an entire width of the tool holder 24 for progressively cutting into at least one wall 14 of a workpiece 12 sequentially as the tool holder 24 moves during the single stroke along a fixed path coaxial with the longitudinal axis of the tool holder 24. The indexable cutter insert means 22 includes first and second indexable cutter insert means, 56 and 58 respectively. The first and second indexable cutter insert means having cutting edges 54 for rough cutting at least one wall 14 of the workpiece 12. The first cutter insert means 56 has a first set of chip breaking grooves 60 and complimentary first fastener means pattern 40 with respect to the first pocket configuration group 36. The second cutter insert means 58 has a second set of chip breaking grooves 62 offset laterally from the first set of chip breaking grooves 60 and complimentary second fastener means pattern 44 with respect to the second pocket configuration group 38. The chip breaking grooves reduce horsepower requirements, breaks the chips into small pieces or configurations and facilities chip removal. The first and second cutter insert means, 56 and 58 respectively, are alternately disposed in corresponding first and second pocket configuration groups, 36 and 38 respectively, along the first longitudinal length of the tool holder 24. Preferably, the first and second cutter insert means, 56 and 58 respectively, are alternately disposed in first and second pocket configuration groups, 36 and 38 respectively, along the first longitudinal length of the first and second surfaces, 26 and 28 respectively, of the tool holder 24 for rough cutting opposing walls, 14 and 16 respectively, of the workpiece 12.

The indexable cutter insert means 22 may also include third indexable cutter insert means 64 for finish cutting at least one wall 14 of the workpiece 12. The third cutter insert means 64 has a complimentary third fastener means pattern 52 with respect to the third pocket configuration group 50. The third indexable cutter insert means 64 has a cutting edge 54 unbroken by chip breaking grooves as best seen in FIG. 9. The third cutter insert means 64 is preferably at a constant height for finishing at least one wall 14 of the workpiece 12 to a desired dimension. Preferably, the third cutter insert means 64 is disposed in corresponding pockets within the third pocket configuration group 50 adjacent a finishing end 48 of the tool holder 24. In the preferred configuration, the third cutter insert means 64 is disposed in corresponding pockets of the third pocket configuration group 50 along the second longitudinal length of the first and second surfaces, 26 and 28 respectively, of the tool holder 24 for finish cutting opposing walls, 14 and 16 respectively, of the workpiece 12. By providing unique fastener means patterns within each pocket configuration group, each of the first, second and third cutter insert means is independently indexable and replaceable within a corresponding pocket, while being interchangeable only within a respective pocket configuration group. In the preferred embodiment, the laterally extending pockets 30 and corresponding cutter insert means 22 are disposed at an angle of approximately 5° from normal with respect to the longitudinal axis in the first and second surfaces, 26 and 28 respectively, of the tool holder 24. As best seen in FIG. 2, the 5° angle from normal with respect to the longitudinal axis is uniform so that all of the pockets 30 and corresponding cutter insert means 22 in the upper or first surface 26 are parallel to one another, while the pockets 30 and corresponding cutter insert means 22 in the underlying or second surface 28 are shown in hidden lines as being uniformly parallel to one another while being skewed at an angle of approximately 5° from normal with respect to the longitudinal axis in an opposite direction from the pockets 30 and cutter insert means 22 of the first surface 26. In addition, as best seen in FIG. 2, the pockets 30 in the first surface 26 are preferably longitudinally offset from the pocket 30 in the second surface 28.

In operation, at a workstation 10, a first end 46 of the tool holder 24 is inserted through an aperture, such as rectangular slot 18, in the workpiece 12 for machining opposing walls, 14 and 16 respectively, to a desired dimension. The tool holer 24 would be pulled along a fixed path coaxial with the longitudinal axis of the tool holder 24 causing the alternating first and second cutter insert means, 56 and 58 respectively, to progressively remove material from the opposing walls, 14 and 16, respectively, since there is a progressive increase in tooth height from cutting edge to cutting edge, such that the thickness of the elongated cutting tool holder 24 increases along its longitudinal length from the first end 46 to the second end 48 as best seen in the progressive cross-sections of FIG. 7 through FIG. 9. After the rough and semi-finish teeth of the first and second indexable cutter insert means, 56 and 58 respectively, a series of teeth corresponding to the third indexable cutter insert means 64 is provided having a constant height or thickness between cutting edge to cutting edge to finish the opposing walls, 14 and 16 respectively, to the desired dimension. Once the internal pull broach 20 has been pulled along the fixed path coaxial with the longitudinal axis to a point where the second end 48 of the tool holder 24 has brought the third cutter insert means 64 into machining contact with the opposing walls, 14 and 16 respectively, of the workpiece 12, the machining operation is completed and the internal pull broach 20 is reversed in its direction of travel along the fixed path coaxial with the longitudinal axis until the first end 46 of the tool holder 24 is removed from the aperture, such as rectangular slot 18 of the workpiece 12.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An internal pull broach for working opposing walls of an aperture through a workpiece during a single stroke machining operation comprising:

an elongated cutting tool holder engageable through said aperture of said workpiece, said tool holder having a longitudinal axis and a lateral width, a plurality of laterally extending, longitudinally spaced pockets on opposite longitudinally extending sides, each pocket extending laterally across substantially the entire width of the tool holder; and indexable cutter insert means engageable in each of said pockets and defining a plurality of sequentially acting, longitudinally spaced protuberances, each protuberance having a plurality of linear cutting edges and indexable within said respective pocket to orientate one cutting edge at a time in an operable position providing a single, linear, leading, cutting edge extending laterally with respect to said longitudinal axis substantially across an entire width of said tool holder for progressively cutting into said opposing walls of said aperture extending through said workpiece sequentially as said tool holder moves during said single stroke along a fixed linear path coaxial with said longitudinal axis of said tool holder extending through said aperture of said workpiece, said indexable cutter insert means for roughing, semi-finishing and finishing said opposing walls of said aperture through said workpiece simultaneously during said single stroke machining operation to form two opposing substantially planar surfaces.

2. The internal pull broach of claim 1 further comprising:
first and second surfaces on said opposite longitudinally extending sides of said tool holder; and
said pockets laterally extending at an angle of approximately 5° from normal with respect to said longitudinal axis of said tool holder, such that a leading edge of one pocket in said first surface is laterally opposite from a leading edge of a corresponding pocket in said second surface.

3. The internal pull broach of claim 1 further comprising:
said pockets divided into groups including a first pocket configuration and a second pocket configuration alternately disposed along a predetermined first longitudinal length of said tool holder.

4. The internal pull broach of claim 3 further comprising:
said first pocket configuration group having a first fastener means pattern and said second pocket configuration group having a second fastener means pattern different from said first pattern.

5. The internal pull broach of claim 4 wherein said indexable cutter insert means further comprises:
first and second indexable cutter insert means for rough cutting said opposing walls of said workpiece, said first cutter insert means having a first set of chip breaking grooves and complementary first fastener means pattern with respect to said first pocket configuration group, said second cutter insert means having a second set of chip breaking grooves offset laterally from said first set and complementary second fastener means pattern with respect to said second pocket configuration group, said first and second cutter insert means alternately disposed in corresponding first and second group pockets along said first longitudinal length of said first and second surfaces, such that each of said first and second cutter insert means is independently indexable and replaceable within any one pocket of said corresponding first and second pocket configurations respectively, while being interchangeable only within that respective pocket configuration group.

6. The internal pull broach of claim 4 further comprising:
a third pocket configuration group disposed along a second longitudinal length of said tool holder adjacent one end.

7. The internal pull broach of claim 6 further comprising:
said third pocket configuration group having a third fastener means pattern different from said first and second patterns.

8. The internal pull broach of claim 7 wherein said indexable cutter insert means further comprises:
third indexable cutter insert means for finish cutting said at least one wall of said workpiece, said third cutter insert means having a complementary third fastener means pattern with respect to said third pocket configuration group, such that said third cutter insert means is independently indexable and replaceable within any one pocket of said corresponding third pocket configuration group, while being interchangeable only within the third pocket configuration group.

9. The internal pull broach of claim 1 further comprising:
said pockets laterally extending at an angle of approximately 5° from normal with respect to said longitudinal axis of said tool holder.

10. An internal pull broach for working opposing walls of an aperture through a workpiece during a single stroke machining operation comprising:
an elongated cutting tool holder engageable through said aperture of said workpiece, said tool holder having a longitudinal axis and a lateral width, a plurality of laterally extending, longitudinally spaced pockets on opposite longitudinally extending sides, each pocket extending laterally across substantially the entire width of the tool holder, said pockets divided into groups including a first pocket configuration and a second pocket configuration alternately disposed along a predetermined first longitudinal length of said tool holder;
first and second indexable cutter insert means disposed in alternating pockets and defining a plurality of sequentially acting, longitudinally spaced protuberances, each protuberance having a plurality of linear cutting edges and indexable within said respective pocket to orientate one cutting edge at a time in an operable position providing a single, linear leading cutting edge extending laterally with respect to said longitudinal axis substantially across an entire width of said tool holder for progressively cutting into said opposing walls of said aperture extending through said workpiece sequentially as said tool holder moves during said single stroke along a fixed linear path coaxial with said longitudinal axis of said tool holder extending through said aperture of said workpiece, said indexable cutter insert means for roughing, semi-finishing and finishing said opposing walls of said aperture through said workpiece simultaneously during said single stroke machining operation to form two opposing substantially planar surfaces; and
first and second fastener means for connecting said first and second indexable cutter insert means to said alternating pockets respectively, said first and second fasteners means having unique configurations such that each insert is independently indexable and replaceable within a corresponding pocket, while being interchangeable only within a respective pocket configuration group.

11. The internal pull broach of claim 10 further comprising:
first and second surfaces on said opposite longitudinally extending sides of said tool holder; and
said pockets laterally extending at an angle of approximately 5° from normal with respect to said longitudinal axis of said tool holder, such that a leading edge of one pocket in said first surface is laterally opposite from a leading edge of a corresponding pocket in said second surface.

12. The internal pull broach of claim 10 further comprising:
said first cutter insert means having a first set of chip breaking grooves and said second cutter insert means having a second set of chip breaking grooves offset laterally from said first set.

13. The internal pull broach of claim 10 further comprising:

a third pocket configuration group disposed along a second longitudinal length of said tool holder adjacent one end.

14. The internal pull broach of claim 13 further comprising:

said third pocket configuration group having a third fastener means pattern different from said first and second patterns.

15. The internal pull broach of claim 14 further comprising:

third indexable cutter insert means for finish cutting said wall of said workpiece, said third cutter insert means having a complementary third fastener means pattern with respect to said third pocket configuration group, such that each of said first, second and third cutter insert means is independently indexable and replaceable within a corresponding pocket, while being interchangeable only within a respective pocket configuration group.

16. The internal pull broach of claim 10 further comprising:

said pockets laterally extending at an angle of approximately 5° from normal with respect to said longitudinal axis of said tool holder.

17. An internal pull broach for working a workpiece having a generally rectangular aperture extending therethrough defined by opposing walls comprising:

an elongated cutting tool holder engageable through said aperture of said workpiece, said tool holder having a longitudinal axis and a lateral width, first and second planar faces extending along the longitudinal axis and spaced radially from one another, a plurality of laterally extending, longitudinally spaced pockets formed in each of said first and second faces, each pocket extending laterally across substantially the entire width of the tool holder; and indexable cutter insert means engageable in each of said pockets and defining a plurality of sequentially acting, longitudinally spaced protuberances, each protuberance having a plurality of linear cutting edges and indexable within said respective pocket to orientate one cutting edge at a time in an operable position providing a single, linear, leading, cutting edge extending laterally with respect to said longitudinal axis substantially across an entire width of said tool holder for progressively cutting into opposing walls of said aperture extending through said workpiece sequentially as said tool holder moves during a single stroke along a fixed linear path coaxial with said longitudinal axis of said tool holder extending through said aperture of said workpiece, said indexable cutter insert means for roughing, semi-finishing and finishing said opposing walls of said aperture through said workpiece simultaneously during said single stroke machining operation to form two opposing substantially planar surfaces.

18. An internal pull broach for working opposing walls of a rectangular slot in a workpiece during a single stroke machining operation comprising:

an elongated cutting tool holder having a longitudinal axis and a lateral width, first and second surfaces on opposite longitudinally extending sides of said tool holder and a plurality of laterally extending, longitudinally spaced pockets in each of said first and second surfaces, each pocket extending laterally across substantially the entire width of the tool holder, said pockets laterally extending at an angle of approximately 5° from normal with respect to said longitudinal axis of said tool holder, such that a leading edge of one pocket in said first surface is laterally opposite from a leading edge of a corresponding pocket in said second surface, said pockets divided into groups including a first pocket configuration and a second pocket configuration alternately disposed along a predetermined first longitudinal length of said tool holder, said first pocket configuration group having a first fastener means pattern and said second pocket configuration group having a second fastener means pattern different from said first pattern, and a third pocket configuration group disposed along a second longitudinal length of said tool holder adjacent one end, said third pocket configuration group having a third fastener means pattern different from said first and second patterns;

first and second indexable cutter insert means for rough cutting said opposing walls of said workpiece, said first cutter insert means having a first set of chip breaking grooves and complementary first fastener means pattern with respect to said first pocket configuration group, said second cutter insert means having a second set of chip breaking grooves offset laterally from said first set and complementary second fastener means pattern with respect to said second pocket configuration group, said first and second cutter insert means alternately disposed in corresponding first and second group pockets along said first longitudinal length of said first and second surfaces; and third indexable cutter insert means for finish cutting said opposing walls of said workpiece, said third cutter insert means having a complementary third fastener means pattern with respect to said third pocket configuration group, such that each of said first, second and third cutter insert means is independently indexable and replaceable within a corresponding pocket, while being interchangeable only within a respective pocket configuration group, said first, second and third indexable cutter insert means engageable in said respective pocket groups and defining a plurality of sequentially acting, longitudinally spaced protuberances, each protuberance having a plurality of linear cutting edges and indexable within said respective pocket to orientate one cutting edge at a time in an operable position providing a single, linear, leading, cutting edge extending laterally with respect to said longitudinal axis substantially across an entire width of said tool holder for progressively cutting into said opposing walls of said aperture extending through said workpiece sequentially as said tool holder moves during said single stroke along a fixed linear path coaxial with said longitudinal axis of said tool holder extending through said aperture of said workpiece, said first, second and third indexable cutter insert means for roughing, semi-finishing and finishing said opposing walls of said aperture through said workpiece simultaneously during said single stroke machining operation to form two opposing substantially planar surfaces.

* * * * *